Aug. 7, 1928.

L. S. WASHBURN 1,679,554

MOLD

Filed Dec. 4, 1925

Inventor
Leon S. Washburn,
By O. E. Bee.
Attorney

Patented Aug. 7, 1928.

1,679,554

UNITED STATES PATENT OFFICE.

LEON S. WASHBURN, OF AKRON, OHIO, ASSIGNOR TO THE GOODYEAR TIRE & RUBBER COMPANY, OF AKRON, OHIO, A CORPORATION OF OHIO.

MOLD.

Application filed December 4, 1925. Serial No. 73,229.

My invention relates to molds and it has particular reference to a mold adapted to receive a rubber article which is to be vulcanized while subjected to the pressure of a fluid contained therein.

It is necessary in the vulcanization of pneumatic tires to support the casing upon a suitable core, which may comprise an annular member of suitable shape inflated to a desired pressure with air, steam or other suitable fluid. Cores of this character, known in the art as airbags, are made of rubber and have valves placed in their inner peripheries through which the inflating fluid may be introduced. Prior to their employment in the vulcanization of pneumatic tires, they must themselves be vulcanized. The molds used for vulcanization of airbags generally comprise a pair of complemental annular members having cavities therein which are adapted to contain the core. During vulcanization of the airbag, a suitable fluid is introduced therein through the valve stem in order to expand it against the walls of the mold cavity and to hold it in the desired shape.

Considerable difficulty has been experienced in the vulcanization of airbags because during assembly of the bag in the mold the valve stem is apt to be misplaced or torn away, with the result that the bag leaks and is so deformed during vulcanization that it is rendered useless for service in the manufacture of pneumatic tires. In many instances, dowel pins, which are provided to align the mold sections, become bent or broken, with the result that the aperture through which the valve stem extends may be partially closed and the valve is subjected to destructive shearing stresses. In other instances, the valve creeps up into the mold cavity, rendering inflation practically impossible. When the airbag is then vulcanized it becomes so deformed that it cannot be employed for its intended purpose.

It is the object of the invention to improve the construction of molds for inflatable articles, such as airbags, in order to avoid the above mentioned difficulties.

A preferred form of mold incorporating the principles of the invention is shown in the attached drawings, wherein.

Figure 2:
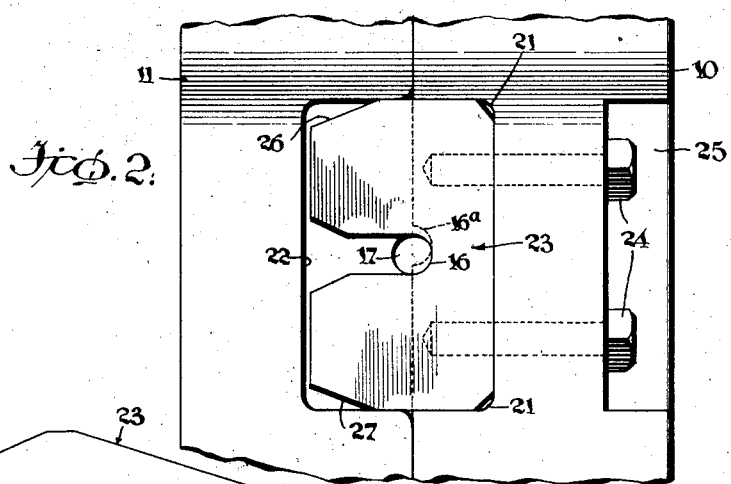
Fig. 2 is a fragmentary plan view of the inner periphery of the mold taken in the region of the valve aperture.
Figure 3:
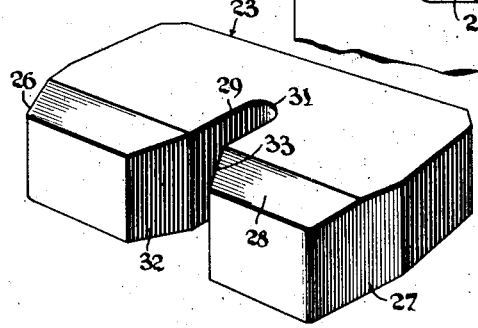
Fig. 3 is a perspective view of a guiding and positioning element.

The mold comprises complemental annular male and female sections 10 and 11 having cavities 12 and 13 formed therein corresponding substantially to the shape of the article which it is desired to manufacture. Each section is provided with corresponding shoulders and recesses 14 and 15 which are adapted to register with each other when the two mold sections are assembled and to align them radially. Semi-cylindrical apertures 16 and 17 are provided in the sections 10 and 11 of the mold, and form a passage when the parts are assembled, through which extends a valve stem 18 of an airbag or other inflatable container 19. It will be apparent from a consideration of Fig. 2 that, if the apertures 16 and 17 are not properly aligned, that is, if the aperture 16 be considered to assume the position represented by the dotted line $16^a$, there is a possibility of shearing the valve stem 18 with a resultant leakage and destruction of the container 19.

In order to prevent destruction of the valve stem and to prevent its slipping upwardly within the mold cavity, the mold sections 10 and 11 are provided with recesses 21 and 22 of substantially rectangular configuration in the region of the apertures 16 and 17. A block, indicated generally by the reference numeral 23, made of such size as to fit snugly within the recess 21, is secured therein by suitable means, such as bolts 24 which pass through the section 10 and are preferably disposed in a countersunk portion 25 provided in the outer face thereof. The block 23 is of such size as to fit within the recess 22 and it is provided with tapered faces 26, 27 and 28, which serve as guides for the mold sections when they are brought into assembled relation. The mid portion of the block 23 is provided with a slot 29 having an inner curved wall 31 and tapered outer faces 32 and 33, which provides a housing and guide for the valve stem 18. Preferably, the width of the block 23 is somewhat less than the overall width of the recesses 21 and 22 in order to provide a slight clearance between the outer edge of the block and the inner wall of the recess 22 which permits the parts to operate properly when the metal becomes expanded.

Figure 1:
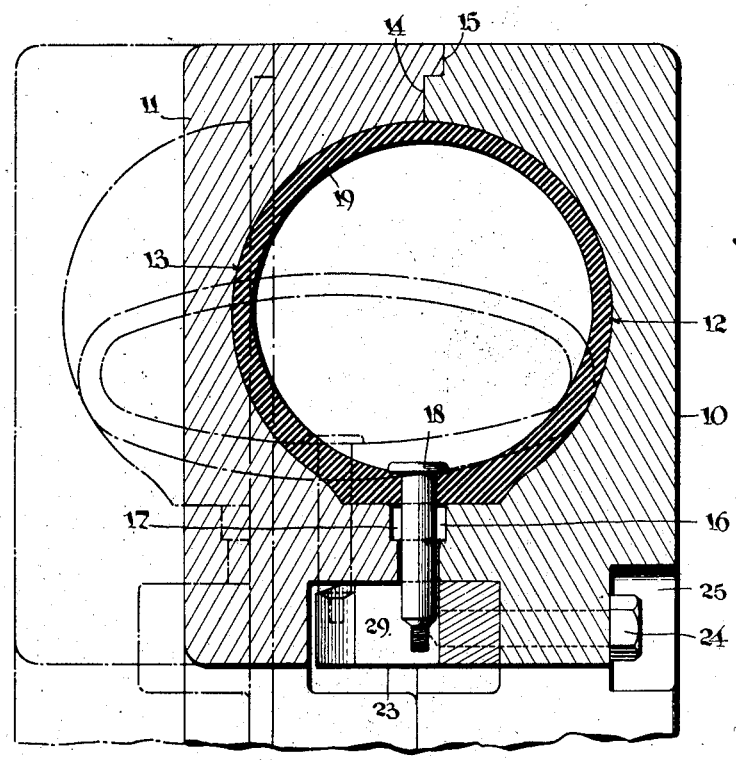
Fig. 1 is a fragmentary cross-sectional view of a mold, with an airbag disposed therein, taken through the valve aperture.

When the airbag 19 has been roughly formed and is ready for vulcanization, it is placed within the mold cavity 12 in a deflated condition with the valve stem 18 disposed in the slot 29, as indicated by the dotted line position in Fig. 1. The mold section 11 is then brought into nesting relation with the mold section 10, the recesses and shoulders 14 and 15 engaging with each other to align the sections radially and the projecting portion of the block 23 registering with the recess 22 to align the sections circumferentially and to insure the positioning of the semi-cylindrical aperture 17 in alignment with the aperture 16. The mold is then placed in a suitable vulcanizing apparatus, fluid under pressure is admitted through the valve stem 18, and the vulcanizing operation completed in accordance with customary practice.

By providing a mold of the type described, the possibilities of the valve being destroyed by mis-alignment of the apertures 16 and 17 or by creeping up within the mold cavity are reduced to a negligible minimum. It is to be noted that the block 23 provides a means not only for properly protecting the valve stem 18, but it also serves to align the mold sections 10 and 11. With this construction, the dowel pins heretofore employed may be dispensed with.

It will be apparent from the foregoing description that a mold is provided which materially facilitates the manufacture of airbags and which operates in a more efficient manner. Obviously, those skilled in the art may resort to modifications of the preferred structure, but which will fall within the spirit of the invention. It is intended, therefore, that only such limitations should be imposed as are indicated by the scope of the following claims.

What I claim is:

1. A mold adapted to receive an inflatable container comprising complemental sections provided with recessed portions adapted to provide a passage for a conduit leading from the container to the exterior of the mold, and means adjacent the recessed portions adapted to surround and protect the conduit and to position the complemental sections in predetermined relation.

2. A mold adapted to receive an inflatable container comprising complemental male and female sections formed with grooves providing a passage for a conduit leading from the container to the exterior of the mold, a recess formed in one section adjacent the groove and a projecting portion on the other section adapted to engage with the recess and to align the conduit in operative position.

3. A mold for inflatable containers comprising a pair of members adapted to enclose the container and formed with grooves adapted to register and to provide a passage for a conduit extending into the container, and a member secured to one of the mold sections adapted to position the conduit and the mold sections.

4. A mold for airbags comprising a pair of complemental sections adapted to enclose the airbag formed with depressed portions providing a passage for a valve stem, a recess formed in each section adjacent the depressed portion, and a block adapted to be positioned in the recesses and to align the mold sections provided with a slot adapted to surround and to position the valve stem.

In witness whereof, I have hereunto signed my name.

LEON S. WASHBURN.